US012707529B2

(12) United States Patent
Luo et al.

(10) Patent No.: US 12,707,529 B2
(45) Date of Patent: Aug. 11, 2026

(54) METHODS, DEVICES, AND SYSTEMS FOR CONFIGURING SIDELINK DRX

(71) Applicant: ZTE Corporation, Shenzhen (CN)

(72) Inventors: Wei Luo, Shenzhen (CN); Lin Chen, Shenzhen (CN); Weiqiang Du, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 380 days.

(21) Appl. No.: 18/112,581

(22) Filed: Feb. 22, 2023

(65) Prior Publication Data

US 2023/0199908 A1 Jun. 22, 2023

Related U.S. Application Data

(63) Continuation of application No. PCT/CN2021/092351, filed on May 8, 2021.

(51) Int. Cl.

*H04W 76/28* (2018.01)
*H04L 5/00* (2006.01)
*H04W 80/02* (2009.01)

(52) U.S. Cl.

CPC .......... *H04W 76/28* (2018.02); *H04L 5/0051* (2013.01); *H04W 80/02* (2013.01)

(58) Field of Classification Search

None

See application file for complete search history.

(56) References Cited

U.S. PATENT DOCUMENTS

2015/0208462 A1 7/2015 Lee
2020/0267513 A1 8/2020 Zhu et al.
2020/0413467 A1 12/2020 Dinan
2021/0051587 A1 2/2021 Wu et al.
2021/0059004 A1 2/2021 Wu et al.
2021/0400745 A1* 12/2021 Kuo ...................... H04W 80/02
2022/0095398 A1* 3/2022 Pan ...................... H04W 76/14
2022/0191794 A1 6/2022 Pan (Continued)

FOREIGN PATENT DOCUMENTS

CN 108307489 A 7/2018
CN 111556590 A 8/2020

(Continued)

OTHER PUBLICATIONS

Author Unknown, Discussion on HARQ related timers in SL DRX, Doc. No. R2-2100863, pp. 1-3, (Year: Feb. 4, 2020).*

(Continued)

*Primary Examiner* — Christopher M Crutchfield

(74) *Attorney, Agent, or Firm* — Crowell & Moring LLP

(57) ABSTRACT

The present disclosure describes methods, system, and devices for configuring a sidelink discontinuous reception (DRX). One method includes obtaining, by a first user equipment (UE), a DRX profile information of a second UE from an upper layer of the first UE; and sending, by the first UE based on the obtained DRX profile information of the second UE, a PC5 message to the second UE or receiving the PC5 message from the second UE. Another method includes sending, by the first UE, DRX configuration assistance information to a second UE; and receiving, by the first UE, a DRX configuration sent from the second UE.

15 Claims, 9 Drawing Sheets

(56) References Cited

U.S. PATENT DOCUMENTS

2023/0063472 A1* 3/2023 Freda ................ H04W 52/0229
2023/0138737 A1* 5/2023 Hong .................... H04W 76/28 370/329
2023/0247550 A1* 8/2023 Yu ......................... H04W 72/02 370/311
2024/0008058 A1* 1/2024 Chang .................. H04W 48/14
2024/0236994 A1* 7/2024 Park ...................... H04L 1/1812
2025/0024367 A1 1/2025 Park

FOREIGN PATENT DOCUMENTS

| | | | |
|---|---|---|---|
| CN | 111800764 | A | 10/2020 |
| CN | 111800894 | A | 10/2020 |
| CN | 112543442 | A | 3/2021 |
| CN | 112673697 | A | 4/2021 |
| CN | 112771969 | A | 5/2021 |
| WO | WO2021034966 | A1 | 2/2021 |
| WO | WO2021080240 | A1 | 4/2021 |
| WO | WO 2021/098100 | A1 | 5/2021 |
| WO | WO2021138789 | A1 | 7/2021 |
| WO | WO 2022/010233 | A1 | 1/2022 |

OTHER PUBLICATIONS

Author Unknown, Issue with SL DRX Inactivity Timer for SL groupcast, Doc. No. R2- 2101192, pp. 1-3, (Year: Feb. 4, 2020).*

Author Unknown, Summary of email discussion [702][SLe] High-level principles for SL DRX (LG), Doc. No. R2-2101727, pp. 1-85, (Year: Jan. 2020).*

Author Unknown, [AT113bis-e][708][V2X/SL] DRX configuration for SL groupcast and broadcast, Doc. No. R2- 2104474, pp. 1-21, (Year: Apr. 20, 2020).*

European Patent Office Office Action regarding 21 941 052.9 dated Oct. 18, 2024, 6 pages.

Final Office Action issued in related U.S. Appl. No. 18/112,592 dated Sep. 22, 2025, (11 pages).

Chinese Office Action with machine translation issued in Chinese Application No. 202180097416.8 dated Aug. 29, 2025, (10 pages).

Non-Final Office Action issued in related U.S. Appl. No. 18/112,592 dated Dec. 22, 2025, (15 pages).

Canadian Patent Office Office Action regarding Application No. 3,188,394 dated Nov. 4, 2024, 8 pages.

Indian Patent Office Hearing Notice issued in Application No. 202317010397 dated Feb. 10, 2026, (3 pages).

Non-Final Office Action issued in related U.S. Appl. No. 18/112,592 dated Jun. 23, 2025, 36 pages.

European Office Action issued in European Application No. 24 170 813.0 dated Mar. 16, 2026 (5 pages).

Qualcomm Incorporated, "Discussion on Sidelink DRX", 3GPP TSG RAN WG2#112-e, Online meeting, R2-2009923, 3rd Generation Partnership Project (3GPP), Mobile Competence Centre ; 650, Route Des Lucioles ; F-06921 Sophia-Antipolis Cedex ; France, vol. RAN WG2, No. Online meeting; Nov. 2, 2020-Nov. 13, 2020, Nov. 2-13, 2020, XP052362968 (6 pages), Retrieved from the Internet: URL: https://ftp.3gpp.org/tsg_ran/WG2_RL2/TSGR2_112-e/Docs/R2-2009923.zip.

"3rd Generation Partnership Project; Technical Specification Group Services and System Aspects; Proximity-based services (ProSe); Stage 2 (Release 12)", 3GPP Standard; 3GPP TS 23.303, 3rd Generation Partnership Project (3GPP), Mobile Competence Centre 650, Route Des Lucioles; F-06921 Sophia-Antipolis Cedex ; France; Feb. 2014, vol. SA WG2, No. V12.0.0, pp. 1-53, XP050769625 (53 pages).

Extended European Search Report regarding Application No. EP 24 17 0813 dated Aug. 2, 2024, 10 pages.

Korean Office Action with English summary regarding Korean Patent Application No. 10-2023-7005796 dated Jun. 2, 2025, 9 pages.

International Search Report and Written Opinion regarding PCT/CN2021/092351 dated Jan. 28, 2022.

Hua Wei et al., "Consideration on the sidelink DRX for unicast, groupcast and broadcast, R2-2009413," *3GPP TSG-RAN WG2 Meeting #112 electronic*, Nov. 13, 2020.

International Search Report and Written Opinion regarding PCT/CN2021/092367 dated Dec. 28, 2021, 7 pages.

Extended International Search Report regarding EP 21 94 1052 dated Jan. 18, 2024, 16 pages.

LG (Rapporteur, "Summary of email discussion [702] [SLe] High-level principles for SL DRX," 3GPP Draft; R2-2101727, 3rd Generation Partnership Project (3GPP), Mobile Competence Centre, 650, Route Des Lucioles; F-06921 Sophia-Antipolis Cedex, France, vol. RAN WG2, No. E-meeting; Jan. 1, 2021, Jan. 22, 2021, XP052170883, 85 pages. Retrieved from the Internet: https://ftp.3gpp.org/tsg_ran/WG2_RL2/TSGR2_113e/Docs/R22101727.zip R2-2101727Summary of email discussion [702] [SLe]High-level principles for SL DRX (LG) .docx.

"3rd Generation Partnership Project, Technical Specification Group Services and System Aspects; Study on architecture enhancements for 3GPP support of advanced Vehicle-to-Everything (V2X) services; Phase 2 (Release 17)," 3GPP Standard; Technical Report, 3GPP TR23.776, 3rd Generation Partnership Project (3GPP), Mobile Competence Centre, 650, Route Des Lucioles, F-06921 Sophia-Antipolis Cedex, France, vol. SA WG2, No. V17.0.0, Mar. 31, 2021, XP052000264, 29 pages. Retrieved from the Internet: https://ftp.3gpp.org/Specs/archive/23_series/23.776/23776-h00.zip_23776-h00.docx.

ZTE, "[AT113bis-e] [708] [V2X/SL] DRX configuration for SL groupcast and Broadcast," 3GPP Draft; R2-2104474, 3rd Generation Partnership Project (3GPP), Mobile Competence Centre, 650, Route Des Lucioles, F-06921 Sophia-Antipolis Cedex, France, vol. RAN WG2, No. electronic, Apr. 12, 2021-Apr. 20, 2021, Apr. 19, 2021, XP051996195, 21 pages. Retrieved from the Internet: https://ftp.3gpp.org/tsg_ran/WG2_RL2/TSGR2_113bis-e/Inbox/R22104474.zip.

Lenovo et al., "Summary of [AT113-e] [708]," 3GPP Draft; R2-2102184, 3rd Generation Partnership Project (3GPP), Mobile Competence Centre; 650, Route Des Lucioles; F-06921 Sophia-Antipolis Cedex, France, vol. RAN WG2, No. E-meeting; Jan. 1, 2021, Feb. 10, 2021, XP051977978, 14 pages. Retrieved from the Internet: https://ftp.3gpp.org/tsg_ran/WG2_RL2/TSGR2_113-e/Docs/R2-2102184.zipR2-2102184-Summarx of AT113-e708_Final_Report.docx.

Extended European Search Report regarding Application No. EP 21 94 1052 dated Jan. 18, 2024, 16 pages.

Extended European Search Report regarding EP 21 94 1047 dated Aug. 29, 2023.

ZTE, "Discussion on PCS DRX," 3GPP Draft R2-1704634, Discussion on PCS DRX, 3rd Generation Partnership Project (3GPP), Mobile Competence Centre; 650, Route Des Lucioles; F-06921 Sophia-Antipolis Cedex, France, vol. RAN WG2, No. Hangzhou, China, XP051275179, May 15, 2017-May 19, 2017, May 14, 2017.

Lenovo et al., "Discussion on SL DRX for unicast," 3GPP Fraft, R2-2103401, 3rd Generation Partnership Project (3GPP), Mobile Competence Centre, 650, Route Des Lucioles, F-06921 Sophia-Antipolis Cedex, France, vol. RAN WG2, No. electronic; Apr. 12, 2021-Apr. 20, 2021, Apr. 2, 2021.

ZTE Corporation et al., "Discussion on SL DRX configuration for unicast," 3GPP Draft, R2-2102980, 3rd Generation Partnership Project (3GPP), Mobile Competence Centre, 650, Route Des Lucioles, F-06921 Sophia-Antipolis Cedex, France, vol. RAN WG2, No. electronic, Apr. 12, 2021-Apr. 20, 2021, Apr. 2, 2021.

Indian First Examination Report regarding 202317010397 dated Apr. 30, 2024, 6 pages.

Korean Office Action with English Summary of the Office Action issued in Korean Patent Application No. 10-2023-7005796 dated Feb. 11, 2026, (9 pages).

Indian First Examination Report regarding 202317010398 dated Mar. 8, 2024, 7 pages.

First Examination Report regarding 3,188,360 dated Aug. 9, 2024, 4 pages.

Indian Refusal Order issued in Indian Application No. 202317010397 dated Apr. 30, 2026 (16 pages).

(56) References Cited

OTHER PUBLICATIONS

Extended European Search Report issued in European Application No. 26159897.3 dated May 21, 2026 (13 pages).
Oppo, "Discussion on DRX configuration", 3GPP TSG-RAN WG2 #113bis-e, E-meeting, R2-2102886, Apr. 2021, XP052174459 (8 pages).
Nokia et al., "Backward Compatibility Issue of SL DRX with Rel. 16 sidelink", 3GPP TSG-RAN WG2 Meeting #113bis Electronic, Elbonia, R2-2103306, Apr. 12-20, 2021, XP051992047 (2 pages).
Ericsson et al., "General aspects of Sl Drx", 3GPP TSG-RAN WG2 #113bis-e, Electronic meeting, R2-2103003, Apr. 12-20, 2021, XP051991988 (8 pages).
U.S. Final Office Action issued in U.S. Appl. No. 18/112,592 dated Apr. 24, 2026 (18 pages).

* cited by examiner

400 obtaining, by a first user equipment (UE), a discontinuous reception (DRX) profile information of a second UE from an upper layer of the first UE;

410 sending, by the first UE based on the obtained DRX profile information of the second UE, a PC5 message to the second UE or receiving the PC5 message from the second UE

600 sending, by a first user equipment (UE), a PC5 message;

610 after sending the PC5 message, starting, by the first UE, a timer;

620 during the timer running, staying, by the first UE, active to monitor a SL channel

700 sending, by a first user equipment (UE), a PC5 message;

710 in response to sending the PC5 message, starting, by the first UE, a round trip time (RTT) timer;

720 in response to the RTT timer expiring, starting, by the first UE, a timer;

730 during the timer running, staying, by the first UE, active to monitor a SL channel

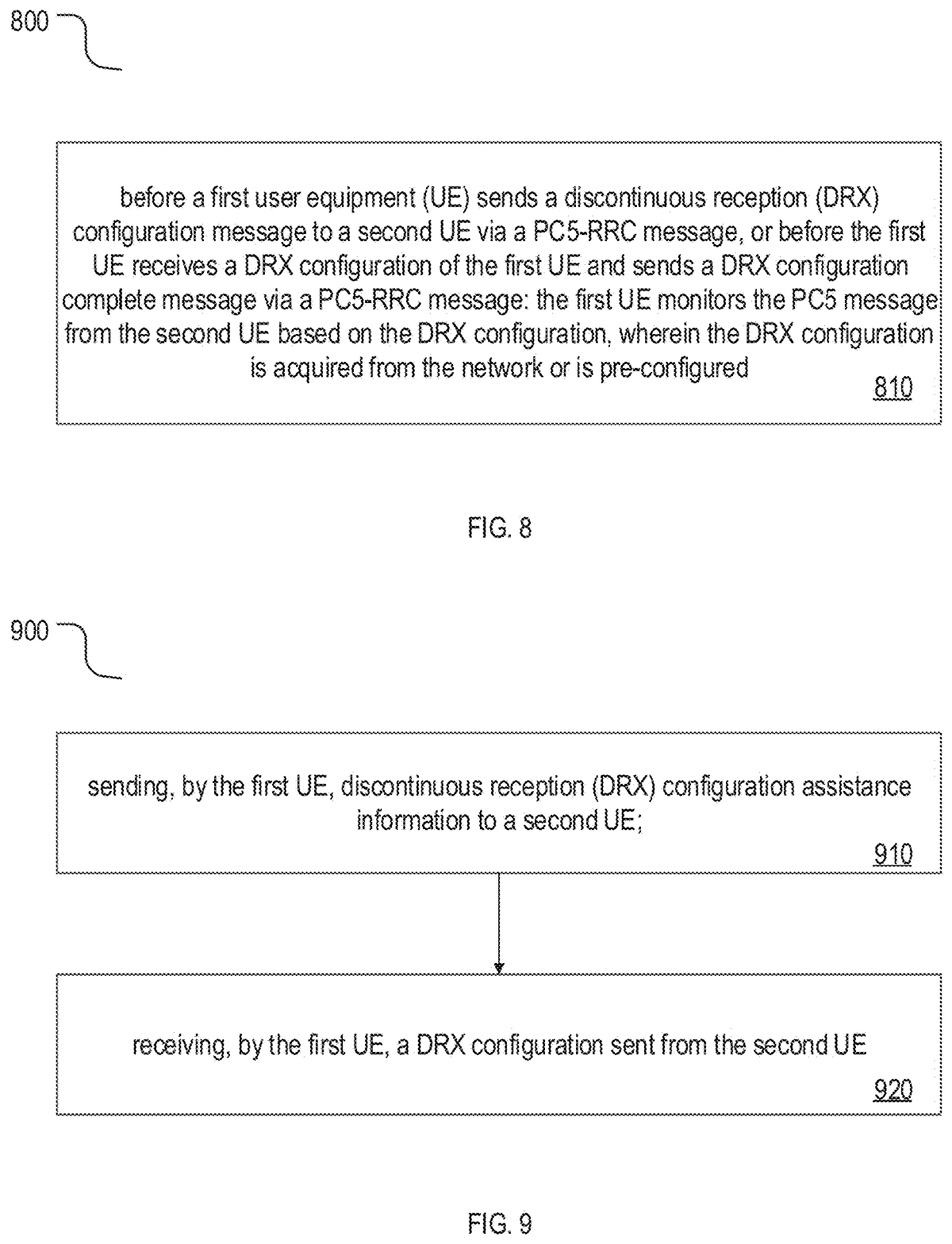

800 before a first user equipment (UE) sends a discontinuous reception (DRX) configuration message to a second UE via a PC5-RRC message, or before the first UE receives a DRX configuration of the first UE and sends a DRX configuration complete message via a PC5-RRC message: the first UE monitors the PC5 message from the second UE based on the DRX configuration, wherein the DRX configuration is acquired from the network or is pre-configured
810

FIG. 8

900 sending, by the first UE, discontinuous reception (DRX) configuration assistance information to a second UE;
910 receiving, by the first UE, a DRX configuration sent from the second UE
920

FIG. 9

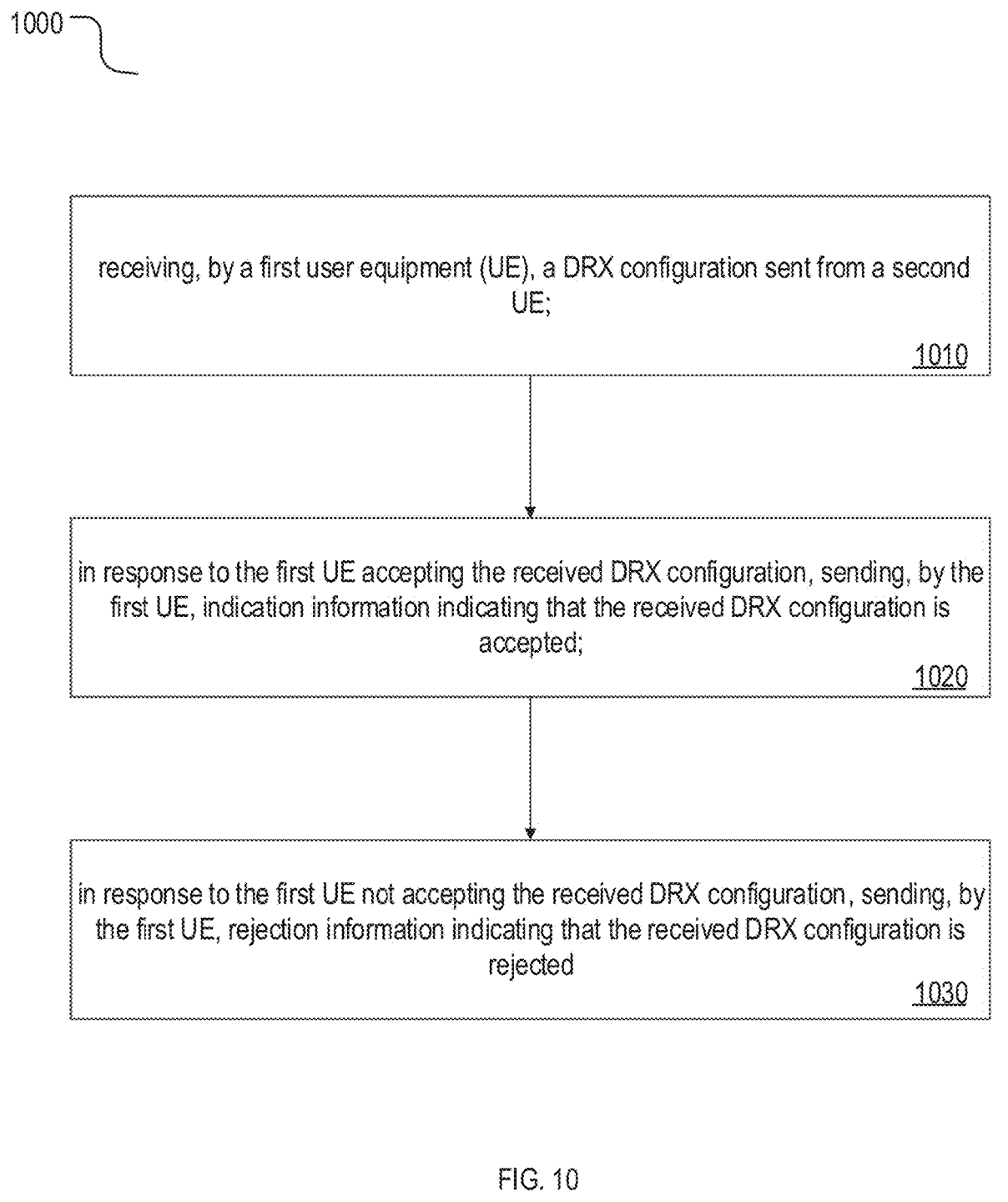

1000 receiving, by a first user equipment (UE), a DRX configuration sent from a second UE;
1010 in response to the first UE accepting the received DRX configuration, sending, by the first UE, indication information indicating that the received DRX configuration is accepted;
1020 in response to the first UE not accepting the received DRX configuration, sending, by the first UE, rejection information indicating that the received DRX configuration is rejected
1030

FIG. 10

METHODS, DEVICES, AND SYSTEMS FOR CONFIGURING SIDELINK DRX

CROSS-REFERENCE TO RELATED APPLICATION

This application is a continuation application of PCT International Patent Application No. PCT/CN2021/092351, filed with the China National Intellectual Property Administration, PRC on May 8, 2021, which is herein incorporated by reference in its entirety.

TECHNICAL FIELD

The present disclosure is directed generally to wireless communications. Particularly, the present disclosure relates to methods, devices, and systems for configuring a sidelink discontinuous reception (DRX).

BACKGROUND

User equipment (UEs) in a wireless network may communicate data with one another via direct sidelink (SL) communication channels without the data being relayed by any wireless access network nodes. In some application scenarios of sidelink communications such as those involving vehicular wireless network devices, communication resource allocation and configuration for one communication terminal may involve another communication terminal in addition to a base station. It is critical to provide a resource allocation, provisioning, and release mechanism to enable low-power and efficient use of sidelink communication resources.

There are various problems/issues with the sidelink communication. The present disclosure describes various embodiments for configuring a sidelink discontinuous reception (DRX), addressing one or more problems/issues and improving the efficiency of the sidelink DRX mechanism.

SUMMARY

This document relates to methods, systems, and devices for wireless communication, and more specifically, for configuring a sidelink discontinuous reception (DRX).

In one embodiment, the present disclosure describes a method for wireless communication. The method includes configuring a sidelink discontinuous reception (DRX) by: obtaining, by a first user equipment (UE), a discontinuous reception (DRX) profile information of a second UE from an upper layer of the first UE; and sending, by the first UE based on the obtained DRX profile information of the second UE, a PC5 message to the second UE or receiving the PC5 message from the second UE.

In another embodiment, the present disclosure describes a method for wireless communication. The method includes configuring a sidelink discontinuous reception (DRX) by: sending, by a first user equipment (UE), a PC5 message; after sending the PC5 message, starting, by the first UE, a timer; and during the timer running, staying, by the first UE, active to monitor a SL channel.

In another embodiment, the present disclosure describes a method for wireless communication. The method includes configuring a sidelink discontinuous reception (DRX) by: sending, by a first user equipment (UE), a PC5 message; in response to sending the PC5 message, starting, by the first UE, a round trip time (RTT) timer; in response to the RTT timer expiring, starting, by the first UE, a timer; and during the timer running, staying, by the first UE, active to monitor a SL channel.

In another embodiment, the present disclosure describes a method for wireless communication. The method includes configuring a sidelink discontinuous reception (DRX) by: before a first user equipment (UE) sends a discontinuous reception (DRX) configuration message to a second UE via a PC5-RRC message, or before the first UE receives a DRX configuration of the first UE and sends a DRX configuration complete message via a PC5-RRC message: the first UE monitors the PC5 message from the second UE based on the DRX configuration, wherein the DRX configuration is acquired from the network or is pre-configured.

In another embodiment, the present disclosure describes a method for wireless communication. The method includes configuring, by a first user equipment (UE), a discontinuous reception (DRX) by: sending, by the first UE, discontinuous reception (DRX) configuration assistance information to a second UE; and receiving, by the first UE, a DRX configuration sent from the second UE.

In another embodiment, the present disclosure describes a method for wireless communication. The method includes configuring a discontinuous reception (DRX) by: receiving, by a first user equipment (UE), a DRX configuration sent from a second UE; in response to the first UE accepting the received DRX configuration, sending, by the first UE, indication information indicating that the received DRX configuration is accepted; and in response to the first UE not accepting the received DRX configuration, sending, by the first UE, rejection information indicating that the received DRX configuration is rejected.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

FIG. 6 shows a flow diagram of a method for wireless communication.

FIG. 7 shows a flow diagram of a method for wireless communication.

FIG. 8 shows a flow diagram of a method for wireless communication.

FIG. 9 shows a flow diagram of a method for wireless communication.

FIG. 10 shows a flow diagram of a method for wireless communication.

DETAILED DESCRIPTION

Figure 1:
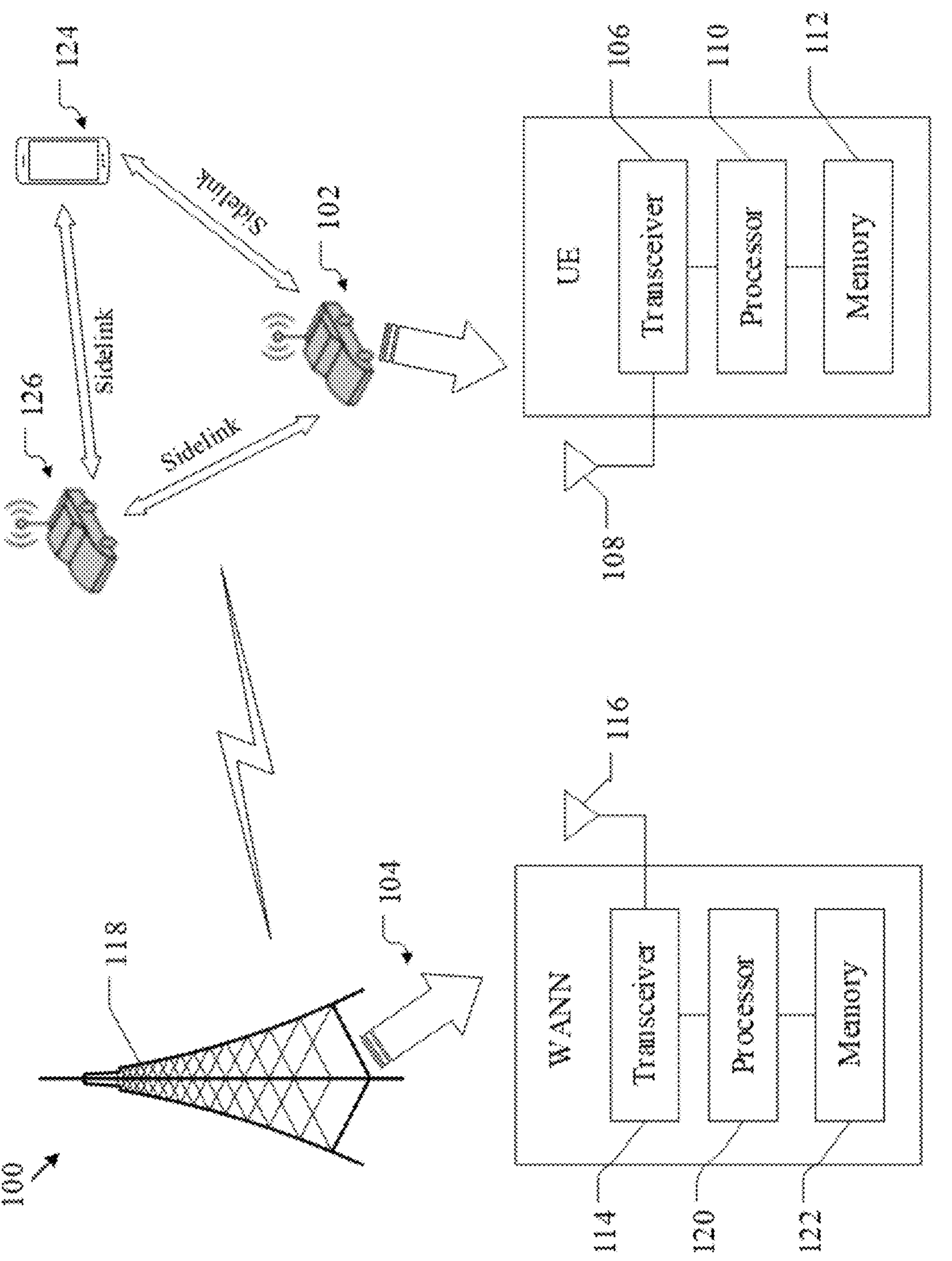
FIG. 1 illustrates an example diagram of a wireless communication network in accordance with various embodiments.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various methods and devices for configuring a sidelink discontinuous reception (DRX).

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfill the requirements from different industries and users.

A vehicle network refers to a network system for wireless communication and information exchange among vehicles, pedestrians, roadside equipment, and the Internet and other data networks in accordance with various communication protocols and data exchange standards. Vehicle network communication helps improve road safety, enhance traffic efficiency, and provide broadband mobile data access and inter-network node data exchanges. The vehicle network communication may be categorized into various types as differentiated according to the communication endpoints, including but not limited to vehicle-to-vehicle (V2V) communication, vehicle-to-infrastructure/vehicle-to-network (V2I/V2N) communication, and vehicle-to-pedestrian (V2P) communication. These types of communication are referred to, collectively, as vehicle-to-everything (V2X) communication.

Such a vehicle network may heavily rely on sidelink communication between the terminal devices or user equipment (UEs) in the network. Sidelink communication, as used in this disclosure, refers to a direct wireless information exchange between UEs. Sidelink (SL) is a unilateral wireless communication service, i.e., the communication between the communication terminals or user equipment (UE). Vehicle networking refers to a large scale system for wireless communication and information exchange among vehicles, pedestrians, roadside equipment, and internet in accordance with agreed communication protocols and data exchange standards. The vehicle networking communications enable the vehicles to gain driving safety, improve traffic efficiency, and acquire convenience or entertainment information. The vehicle networking communication may be categorized into three types as per the objects of wireless communication: the communication between vehicles, i.e., vehicle-to-vehicle (V2V); the communication between vehicles and roadside equipment/network infrastructures, i.e., vehicle-to-infrastructure/vehicle-to-network (V2I/V2N); and the communication between vehicles and pedestrians, i.e., vehicle-to-pedestrian (V2P). These types of communications collectively are referred to as vehicle-to-everything (V2X) communication.

In the V2X communication research of 3rd Generation Partnership Project (3GPP), the sidelink based V2X communication between user equipment is one of the manners to implement the V2X standard, in which traffic data is directly transmitted from a source UE to a destination UE via an air interface without forwarding by the base station and the core network. This V2X communication is referred to as PC5-based V2X communication or V2X sidelink communication.

With the technology advancement and development of the automation industry, the scenarios for V2X communications are further diversified and require higher performance. The advanced V2X services include vehicle platooning, extended sensors, advanced driving (semi-automated driving and full-automated driving), and remote driving. The desired performance requirements may include: supporting data packet with the size of 50 to 12000 bytes, transmission rate with 2 to 50 messages per second, the maximum end-to-end delay of 3 to 500 milliseconds, reliability of 90% to 99.999%, data rate of 0.5 to 1000 Mbps, as well as transmission range of 50 to 1000 meters.

An example V2X subsystem based on sidelink communication technology is illustrated as part of FIG. 1 and may be referred to as, for example, PCS-based V2X communication or V2X sidelink communication.

While being capable of communicating among themselves using sidelinks, the various UEs described above may also be connected to wireless access networks, and to a core network via the access networks. The wireless access network and core network may be involved in configuring and provisioning communication resources needed for data and control information transmission/reception for sidelink communication. An example wireless access network may be based on, for example, cellular 4G LTE or 5G NR technologies and/or formats. FIG. 1 shows an example system diagram of a wireless access communication network 100 including UEs 102, 124, and 126 as well as a wireless access network node (WANN) 104. Each of the UEs 102, 124, and 126 may include but is not limited to a mobile phone, a smartphone, a tablet, a laptop computer, a vehicle on-board communication equipment, a roadside communication equipment, a sensor device, a smart appliance (such as a television, a refrigerator, and an oven), or other devices that are capable of communicating wirelessly over a network. The UEs may indirectly communicate with each other via the WANN 104 or directly via sidelinks. As shown in FIG. 1, each of the UEs such as UE 102 may include transceiver circuitry 106 coupled to an antenna 108 to effectuate wireless communication with the WANN 104 or with another UE such as UE 124 or 126. The transceiver circuitry 106 may also be coupled to a processor 110, which may also be coupled to a memory 112 or other storage devices. The memory 112 may store therein computer instructions or code which, when read and executed by the processor 110, cause the processor 110 to implement various ones of the methods for sidelink resource allocation/configuration/release and data transmission/reception described herein.

Similarly, the WANN 104 may include a base station or other wireless network access points capable of communicating wirelessly over a network with one or more UEs and communicating with a core network. For example, the WANN 104 may be implemented in the form of a 4G LTE base station, a 5G NR base station, a 5G central-unit base station, or a 5G distributed-unit base station. Each type of these WANNs may be configured to perform a corresponding set of wireless network functions. The WANN 104 may include transceiver circuitry 114 coupled to an antenna 116, which may include an antenna tower 118 in various forms, to effectuate wireless communications with the UEs 102, 124, and 126. The transceiver circuitry 114 may be coupled to one or more processors 120, which may further be coupled to a memory 122 or other storage devices. The memory 122 may store therein instructions or code that, when read and executed by the processor 120, cause the processor 120 to implement various functions. These functions, for example, may include those related to the sidelink resource allocation, configuration, provisioning and releases described below.

For simplicity and clarity, only one WANN and three UEs are shown in the wireless communication access network 100. It will be appreciated that one or more WANNs may exist in the wireless communication network, and each WANN may serve one or more UEs. While the UEs 102, 124, and 126 of FIG. 1 are shown as being served within one serving cell, they may alternatively be served by different cells and/or by no cell. While various embodiments of sidelink communication below are discussed in the context of the particular example cellular wireless communication access network 100, the underlying principle apply to other types of wireless communication networks.

Sidelink communication among the various UEs of FIG. 1 may support co-existence of various distinct communication cast types including unicast, group-cast (or multicast), and broadcast. In one implementation, the cast type may be referred as a cast mode. In conventional technologies, the UEs deployed in the access network 100 may be required to perform exhaustive monitoring of a large range of sidelink wireless resources in either unicast, group-cast, or broadcast mode, thereby incurring a large power consumption. Such power consumption may be at an unacceptably high level for some low power UEs.

In the sidelink communication such as V2X communication between UEs, the UEs monitor the sidelink signals within the entire range of sidelink receive resource pool, which can result in large power consumption and reduced efficiency. One of the objectives of the present disclosure is to reduce the power consumption of the sidelink communication while meeting the time delay requirements.

One manner of reducing power consumption when using sidelink (SL) communication between UEs is to utilize discontinuous reception (DRX) and/or discontinuous transmission (DTX) methodologies. However, such SL DRX requires that the transmission UE and reception UE at least know the DRX configuration of the corresponding UE. DRX configuration information may include, for example, a delay (e.g., sl-drx-SlotOffset) before starting an on duration timer (e.g., sl-drx-onDurationTimer); the on duration timer (e.g., sl-drx-onDurationTimer), which is the duration at the beginning of an SL DRX cycle; a subframe where the SL DRX cycle starts (sl-drx-StartOffset); and the SL DRX cycle (sl-drx-Cycle). This disclosure discusses methods in which these configuration information/parameters are determined and communicated amongst UEs and/or how the UE configures these configuration information/parameters.

Figure 2:
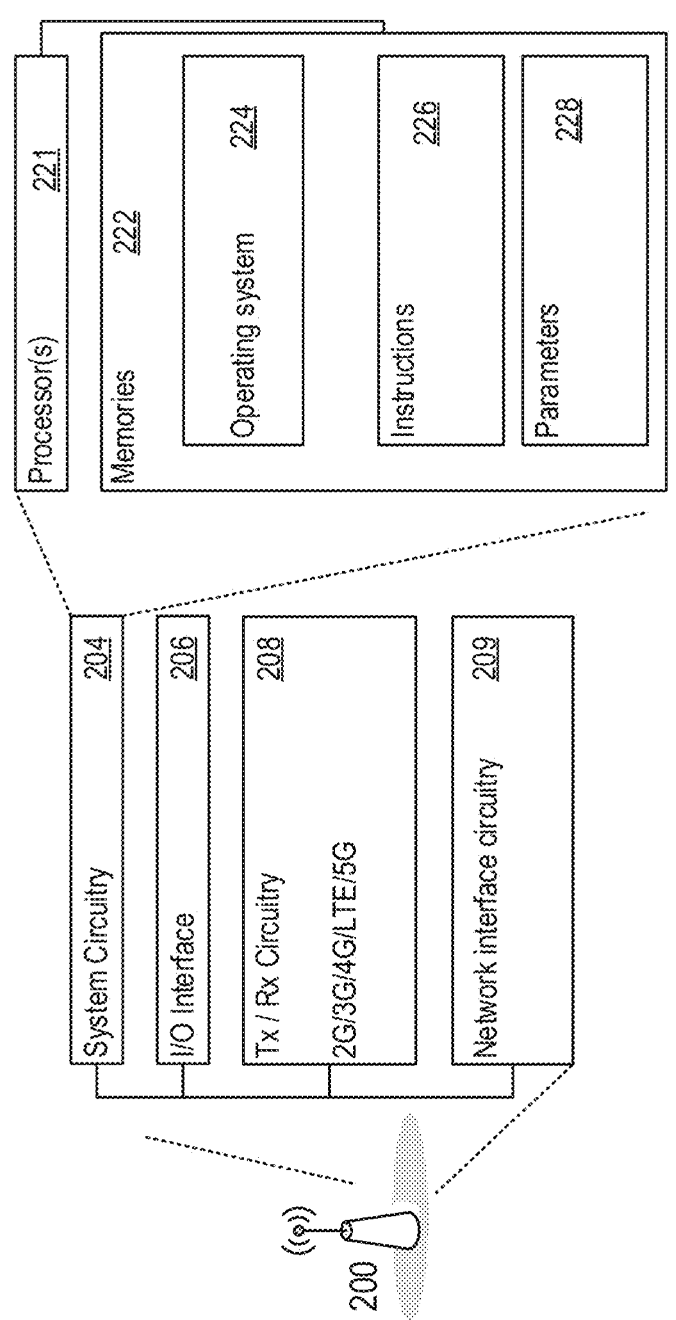
FIG. 2 shows an example of a wireless network node.

FIG. 2 shows an example of electronic device 200 to implement a network base station (e.g., a radio access network node), a core network (CN), and/or an operation and maintenance (OAM). Optionally in one implementation, the example electronic device 200 may include radio transmitting/receiving (Tx/Rx) circuitry 208 to transmit/receive communication with UEs and/or other base stations. Optionally in one implementation, the electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 221 to perform the functions of the network node. The parameters 228 may include parameters to support execution of the instructions 226. For example, parameters may include network protocol settings, bandwidth parameters, radio frequency mapping assignments, and/or other parameters.

Figure 3:
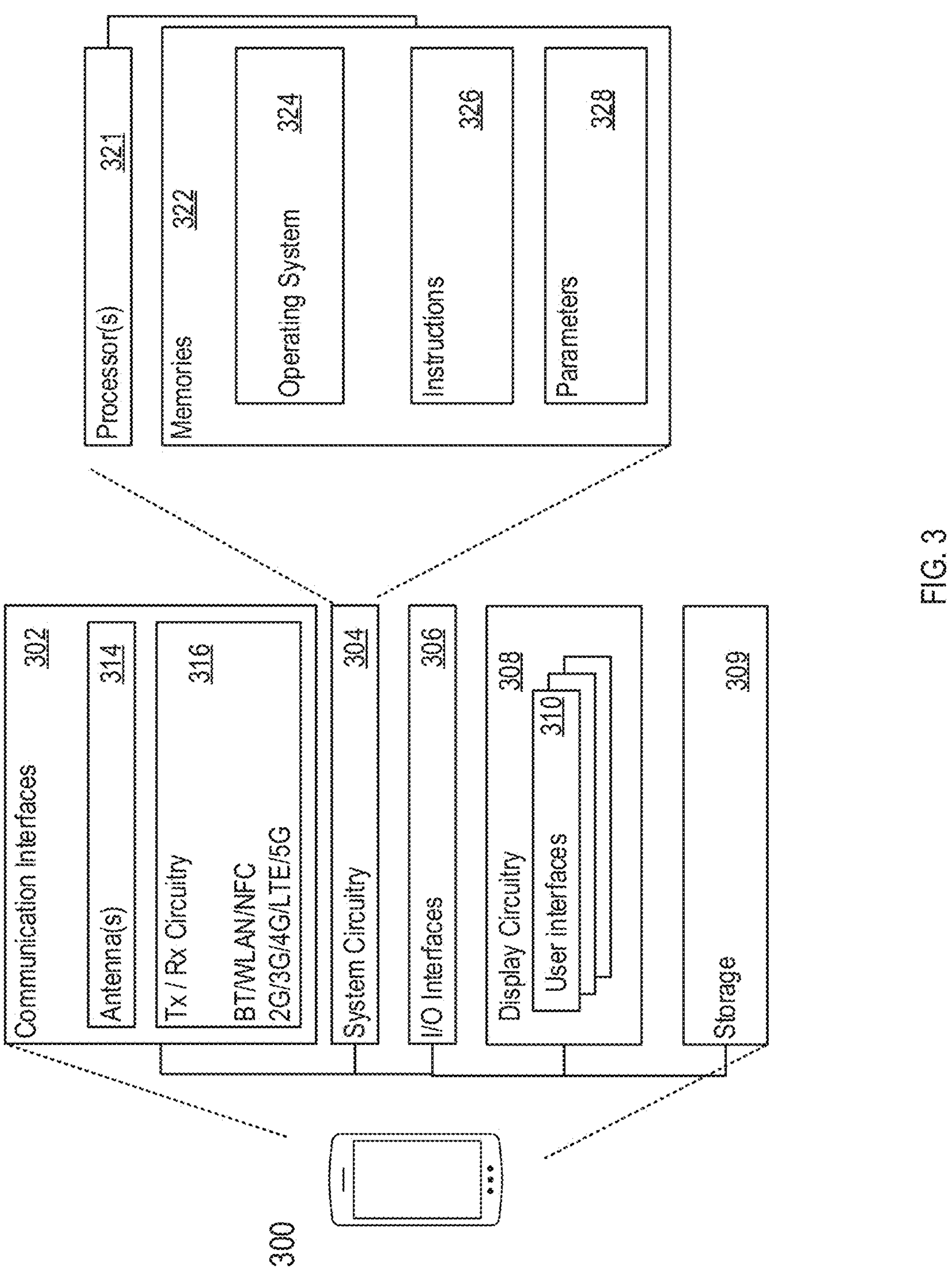
FIG. 3 shows an example of a user equipment.

FIG. 3 shows an example of an electronic device to implement a terminal device 300 (for example, a user equipment (UE)). The UE 300 may be a mobile device, for example, a smart phone or a mobile communication module disposed in a vehicle. The UE 300 may include a portion or all of the following: communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes various embodiments for configuring a sidelink discontinuous reception (DRX), which may be implemented, partly or totally, on one or more electronic device 200 and/or one or more terminal device 300 described above in FIGS. 2-3.

Figure 4:
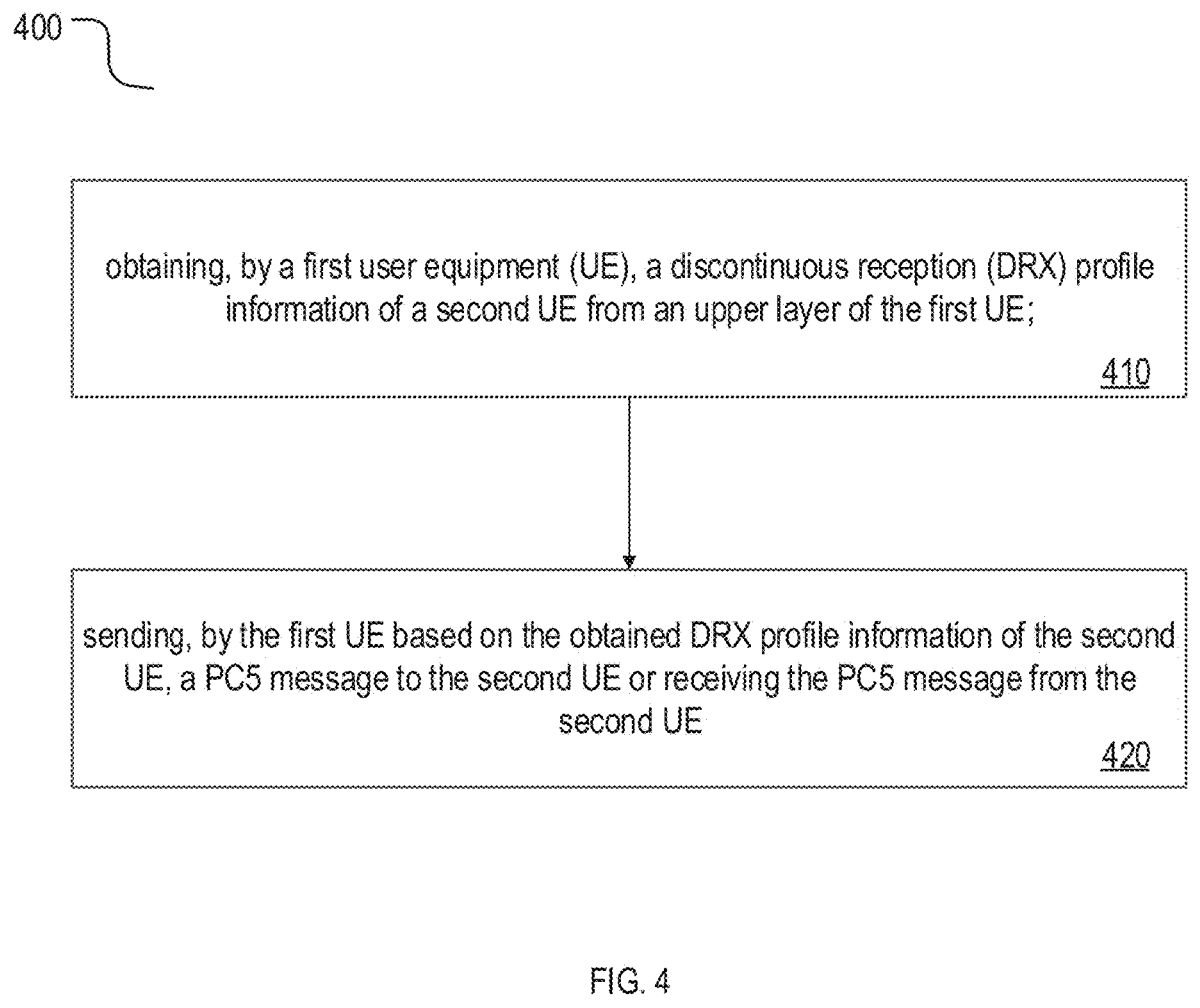

In one embodiment, referring to FIG. 4, a method 400 for wireless communication includes configuring a sidelink discontinuous reception (DRX). The method 400 may include a portion or all of the following steps: step 410, obtaining, by a first user equipment (UE), a discontinuous reception (DRX) profile information of a second UE from an upper layer of the first UE; and step 420, sending, by the first UE based on the obtained DRX profile information of the second UE, a PC5 message to the second UE or receiving the PC5 message from the second UE.

In one implementation, the obtained DRX profile information of the second UE indicates at least one of the following: the second UE supports the DRX; the second UE does not support the DRX; or it is unknown whether the second UE supports the DRX.

In another implementation, the method 400 may further include obtaining, by the first UE, a DRX configuration from a network or pre-configuration, the DRX configuration comprising a set of DRX parameter, wherein the set of DRX parameters comprises at least one of the following: a DRX cycle; a slot offset; an on-duration timer; or a start offset.

In another implementation, the DRX profile information of the second UE is associated with at least one of the following: a destination layer-2 ID information; or a cast type related information.

Figure 5:
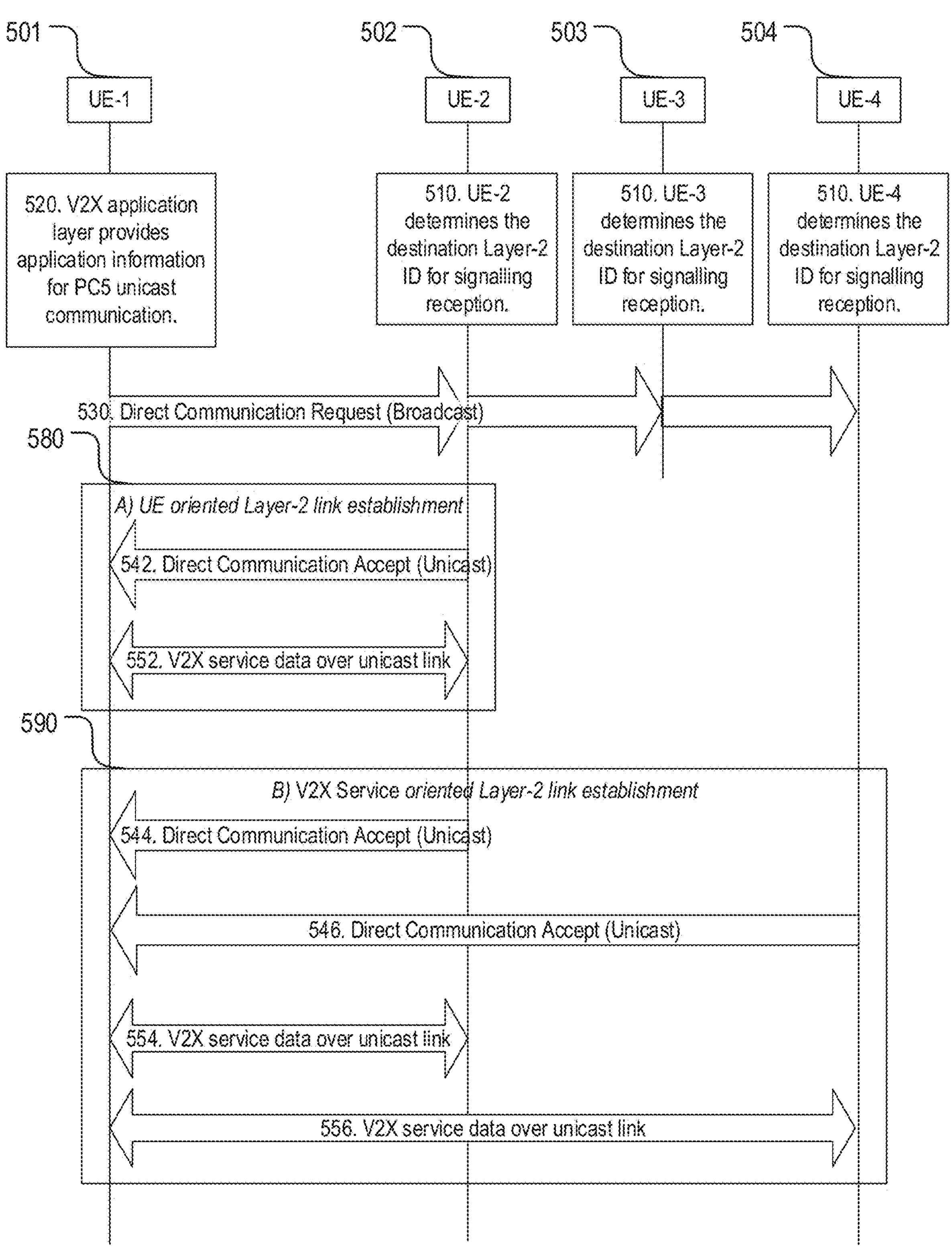
FIG. 5 shows an exemplary logic flow of a method for wireless communication.

In various embodiments as shown in FIG. 5, to perform unicast mode of V2X communication over PC5 reference point, the UE is configured with the related information. FIG. 5 shows various embodiments of the layer-2 link establishment procedure for unicast mode of V2X communication over a PC5 reference point.

There may be a first UE (UE-1, 501), a second UE (UE-2, 502), a third UE (UE-3, 503), and a fourth UE (UE-4, 504). In some embodiments, there may be more than four UEs or fewer than four UEs. In some embodiments, any other UE, except the first UE, may be referred as a "second UE". In some embodiments, the first UE may be referred as a transmitting (TX) UE, and any other UE except the first UE may be referred as a receiving (RX) UE.

Referring to step 510 in FIG. 5, the UE(s) determines the destination Layer-2 ID for signaling reception for PC5 unicast link establishment.

Referring to step 520 in FIG. 5, the V2X application layer in UE-1 provides application information for PC5 unicast communication. The application information includes the V2X service type(s) and the initiating UE's Application Layer ID. The target UE's Application Layer ID may be included in the application information.

The V2X application layer in UE-1 may provide V2X Application Requirements for this unicast communication.

If UE-1 decides to reuse the existing PC5 unicast link, the UE triggers Layer-2 link modification procedure.

Referring to step 530 in FIG. 5, the UE-1 may send a direct communication request to other UE via a broadcast mode.

Various embodiments include a UE oriented layer-2 link establishment, as shown in 580 in FIG. 5.

In step 542, a target UE, for example, the UE-2, may send a direct communication accept to the UE-1 in a unicast mode.

In step 552, after the UE-1 receives the direct communication accept from the UE-2, the UE-1 and the UE-2 may establish and communicate V2X service data over unicast link.

Various embodiments include a V2X service oriented layer-2 link establishment, as shown in 590 in FIG. 5.

In step 544, a target UE, for example, the UE-2, may send a direct communication accept to the UE-1 in a unicast mode. In step 546, another target UE, for example, the UE-4, may send a direct communication accept to the UE-1 in a unicast mode.

In step 554, after the UE-1 receives the direct communication accept from the UE-2, the UE-1 and the UE-2 may establish and communicate V2X service data over unicast link. In step 556, after the UE-1 receives the direct communication accept from the UE-4, the UE-1 and the UE-4 may establish and communicate V2X service data over unicast link.

In various embodiments, a first UE may obtain one or more DRX profile information from an upper layer of the first UE, for example but not limited to, a destination Layer-2 ID and/or a cast type associated configuration information, to determine that a target UE, for example, a second UE, supports DRX function.

Then, in some implementations, the first UE may activate its DRX function.

In some implementations, before obtaining a DRX configuration of the second UE, the first UE may send a PC5 message to the second UE based on a DRX configuration obtained from a network or pre-configured.

In various embodiments, a first UE may obtain one or more DRX configuration information from an upper layer of the first UE, for example but not limited to, a destination Layer-2 ID and/or a cast type associated configuration information, to determine that a target UE, for example, a second UE, may not support DRX function.

Then, in some implementations, the first UE may not activate its DRX function.

In some implementations, the first UE may send a PC5 message, which may include indication information indicating whether a SL DRX function is supported or TX profile indication indicating whether a SL DRX function is supported.

If the SL DRX function is indicated to be supported, the first UE may activate the SL DRX function, based on a SL DRX configuration, to monitor subsequent PC5 messages. The SL DRX configuration may be obtained from a network or pre-configured.

If the indication information indicates that SL DRX function is not supported or no indication information is received, the first UE may determine that SL DRX function is not supported, and thus may not activate the SL DRX function.

In various embodiments, a first UE may not obtain information to determine whether a second UE supports a DRX function, the first UE may use a DRX configuration information, which is configured by the network or pre-configured or UE implementation.

In some implementations, the DRX configuration information may be used to receive a PC5-S message before receiving a PC5-RRC message to establish a connection. For example but not limited to, the DRX configuration information may include a value of an on-duration timer being equal to a value of T5000, as shown in Table 1.

In some implementations, if the UE receives a PC5-S message such as DIRECT LINK ESTABLISHMENT REQUEST, if may stop the on duration timer.

TABLE 1

| Information of T5000 | | | | |
|---|---|---|---|---|
| TIMER NUM. | TIMER VALUE | CAUSE OF START | NORMAL STOP | ON EXPIRY |
| T5000 | 8 s | Upon sending a DIRECT LINK ESTABLISHMENT REQUEST message | Upon receiving a DIRECT LINK ESTABLISHMENT ACCEPT or DIRECT LINK ESTABLISHMENT REJECT message from the target UE | Retransmission of DIRECT LINK ESTABLISHMENT REQUEST message |

In various embodiments, in response to the obtained DRX profile information of the second UE indicating the second UE supporting the DRX, the first UE monitors the PC5 message from the second UE based on a DRX configuration, wherein the DRX configuration is acquired from a network or is pre-configured.

In one implementation, the DRX configuration comprises a set of DRX parameters, wherein the set of DRX parameters comprises at least one of the following: a DRX cycle; a slot offset; an on-duration timer; or a start offset.

In another implementation, the PC5 message comprises at least one of the following: a PC5-RRC message; a PC5-S message; or a PC5-data message.

In another implementation, the PC5-S message comprises at least one of the following: a protected PC5-S message; or a unprotected PC5-S message.

In another implementation, the first UE monitors the PC5 message from the second UE during a layer-2 link establishment procedure.

In another implementation, the PC5 message comprises at least one of the following: a direct communication request message; or a direct communication accept message.

In another implementation, before the second UE acquires a DRX configuration of the first UE via a PC5-RRC message, or before the second UE receives a DRX configuration complete message from the first UE via a PC5-RRC message: the second UE sends the PC5 message to the first UE based on the DRX configuration, wherein the DRX configuration is acquired from the network or is pre-configured.

In another implementation, before the first UE sends the DRX configuration to the second UE via a PC5-RRC message, or before the first UE receives the DRX configuration of the first UE and sends a DRX configuration complete message to the second UE via a PC5-RRC message: the first UE monitors the PC5 message from the second UE based on the DRX configuration, wherein the DRX configuration is acquired from the network or is pre-configured.

In another implementation, the second UE establishes a security connection with the first UE; and the second UE transmits, to the first UE, a direct communication accept message in response to a direct communication request message.

In another implementation, the second UE establishes a security connection with the first UE by: including, by the first UE, a target user information in the direct communication request message, the target user information indicating the second UE; and establishing, by the second UE, the security connection with the first UE in response to the target user information.

In another implementation, in response to the direct communication request message not including a target user information and the second UE being interested in using a V2X service type over a PC5 unicast link with the first UE, the second UE establishes a security connection with the first UE.

In another implementation, in response to the second UE transmitting a PC5-S message to the first UE after receiving a direct communication request message, the first UE starts an inactivity timer.

In another implementation, the PC5-S message is used for establishing a security connection.

Figure 6:
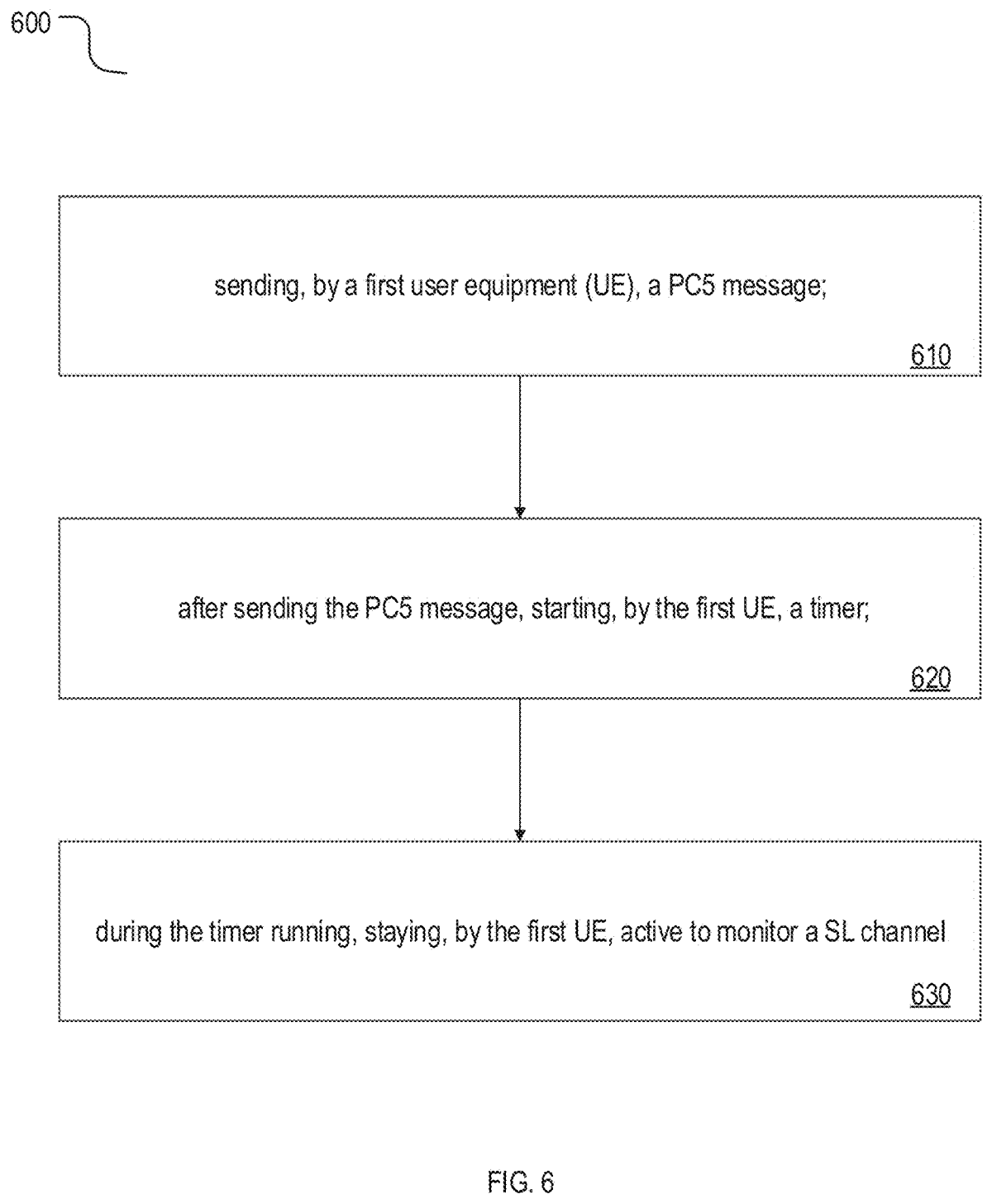

In one embodiment, referring to FIG. 6, a method 600 for wireless communication includes configuring a sidelink discontinuous reception (DRX). The method 600 may include a portion or all of the following steps: step 610, sending, by a first user equipment (UE), a PC5 message; step 620, after sending the PC5 message, starting, by the first UE, a timer; and step 630, during the timer running, staying, by the first UE, active to monitor a SL channel.

In one implementation, a value of the timer is received from a network or is per-configured.

In another implementation, a time duration after the first UE sends the PC5 message, the second UE starts a timer.

In another implementation, the time duration comprises a number of millisecond (ms) or a number of slots.

In another implementation, the time duration is received from a network or is per-configured.

In another implementation, in response to receiving a second PC5 message from the second UE, the first UE stops the timer.

For one example, in some embodiments, a UE may monitor PC5 message, for example, a direct communication request, with a configured SL DRX configuration, which, for example but not limited to, may be performed during step 530 in FIG. 5.

In one implementation, the SL DRX configuration is acquire from the network or pre-configuration.

In another implementation, the SL DRX configuration includes one or more SL DRX configurations.

In another implementation, the DRX configuration includes: a DRX cycle, a slot offset, and an on duration timer.

In another implementation, one of the SL DRX configuration is used when monitoring the message during Layer-2 link establishment procedure, for example: direct communication request message, or direct communication accept message.

In another implementation, one of the DRX configuration is used when monitoring the PC5-S message, the PC5-S message includes protected PC5-S message and/or unprotected PC5-S message.

In another implementation, one of the DRX configuration is used when monitoring the message from UE1 before the UE2 acquire the DRX configuration of UE1 via PC5 RRC message.

In some embodiments, a direct communication accept message may be sent to UE-1 by the UE2 that has successfully established security with UE-1, which, for example but not limited to, may be performed during step 542 or 544 in FIG. 5.

In some embodiments, before step 520, a security with UE-1 may be established as one of the following methods.

For method 1, if target user information is included in the direct communication request message, the target UE, i.e., UE-2, responds by establishing the security with UE-1.

For method 2, if the target user information is not included in the direct communication request message, the UEs that are interested in using the announced V2X service type(s) over a PC5 unicast link with UE-1 responds by establishing the security with UE-1.

In some embodiments, after PC5 message (such as direct communication request) is sent, the UE1 restarts or starts a timer T0, when the T0 is running, the UE1 shall be in active to monitor the SL channel.

In some implementations, t slots or t millisecond (ms) after sending a PC5 message (such as direct communication request), the UE2 restarts or starts a timer T0.

In some implementations, a value of T0 and/or t is received from the network.

In some implementations, the value of T0 and/or t is preconfigured.

In some implementations, if target user information is included in the direct communication request message, and the UE1 receive a PC5 message from the Target User, it can stop the timer T0.

For another example, in some embodiments, for a receiving UE, a UE2 monitors direct communication request message based on a SL DRX configuration.

In one implementation, the SL DRX configuration is acquired from the network or pre-configuration.

In another implementation, the SL DRX configuration includes one or more SL DRX configurations.

In another implementation, the DRX configuration includes: a DRX cycle, a slot offset, and an on duration timer.

In another implementation, one of the SL DRX configuration is used when monitoring the message during Layer-2 link establishment procedure, for example: direct communication request message, or direct communication accept message.

In another implementation, one of the DRX configuration is used when monitoring the PC5-S message, the PC5-S message includes protected PC5-S message and/or unprotected PC5-S message.

In various embodiments, when UE 2 transmits a PC5-S message after receiving a direct communication request message, it may start an inactivity timer.

In various embodiments, in response to the obtained DRX profile information of the second UE indicating that the second UE does not supporting the DRX or not knowing whether the second UE supports the DRX, and the first UE supporting the DRX:

the first UE monitors a reception resource pool for sidelink groupcast or broadcast to receive a PC5 message.

In one implementation, the second PC5 message comprises a PC5-S message or a PC5-RRc message.

In another implementation, in response to sending the PC5 message, the first UE starts a timer; and during the timer running, the first UE is active and monitor a SL channel.

In another implementation, a time duration after the first UE sends the PC5 message, the second UE starts a timer.

In another implementation, the time duration comprises a number of millisecond (ms) or a number of slots.

In another implementation, the time duration is received from a network or is per-configured.

In another implementation, in response to a direct communication request message comprising a target user information and the first UE receiving a second PC5 message from the second UE, the first UE stops the timer.

In another implementation, the time duration is same as a value of a round trip timer (RTT) timer.

In another implementation, in response to sending the PC5 message, the first UE starts a RTT timer; in response to the RTT timer expiring, the first UE starts a timer; and during the timer running, the first UE is active and monitor a SL channel.

Figure 7:
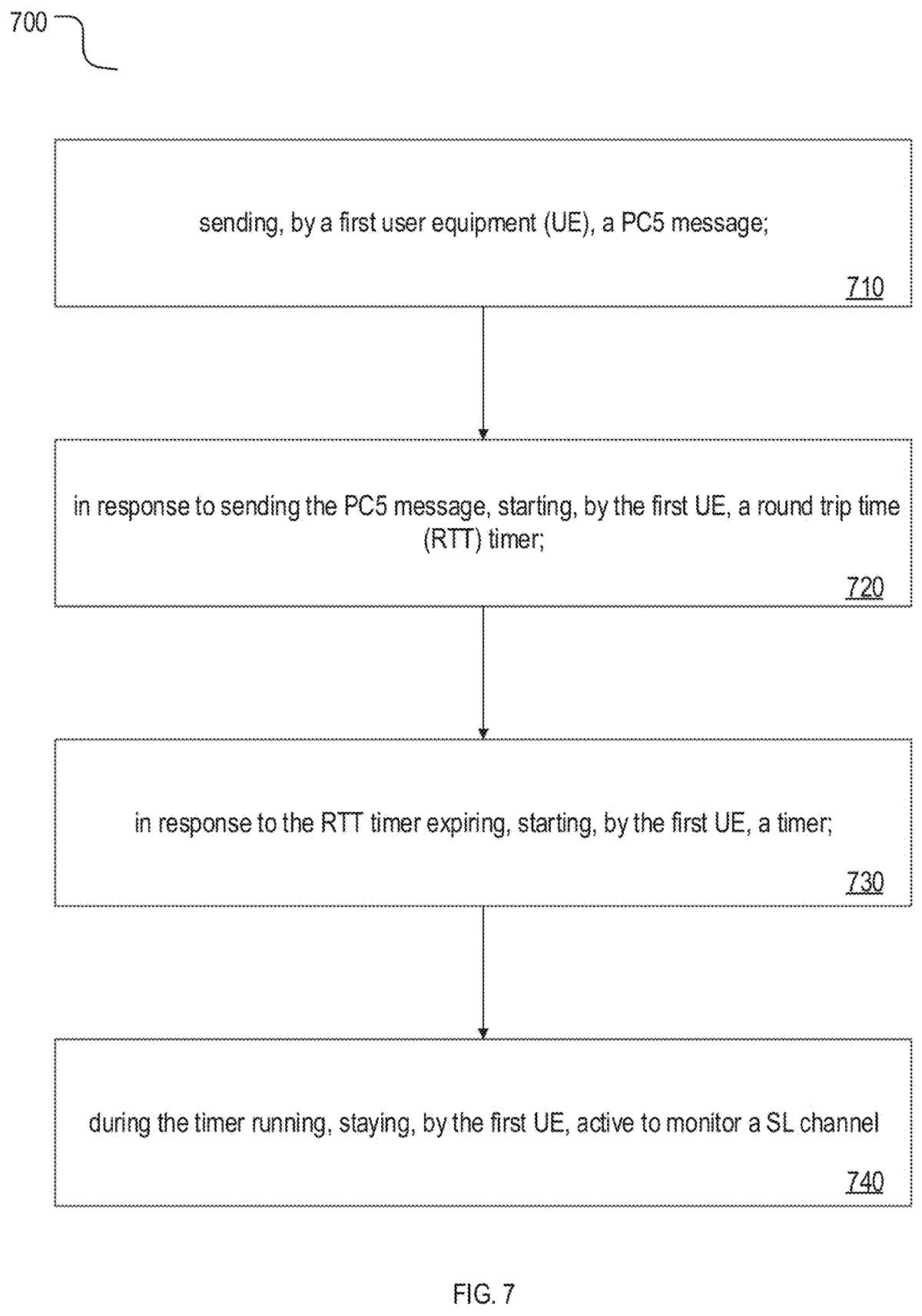

In one embodiment, referring to FIG. 7, a method 700 for wireless communication includes configuring a sidelink discontinuous reception (DRX). The method 700 may include a portion or all of the following steps: step 710, sending, by a first user equipment (UE), a PC5 message; step 720, in response to sending the PC5 message, starting, by the first UE, a round trip time (RTT) timer; step 730, in response to the RTT timer expiring, starting, by the first UE, a timer; and step 740, during the timer running, staying, by the first UE, active to monitor a SL channel.

In one implementation, a value of the timer is received from a network or is per-configured.

In another implementation, a time duration after the first UE sends the PC5 message, the second UE starts a timer.

In another implementation, the time duration comprises a number of millisecond (ms) or a number of slots.

In another implementation, the time duration is received from a network or is per-configured.

In one embodiment, referring to FIG. 8, a method 800 for wireless communication includes configuring a sidelink discontinuous reception (DRX). The method 800 may include a portion or all of the following steps: step 810, before a first user equipment (UE) sends a discontinuous reception (DRX) configuration message to a second UE via a PC5-RRC message, or before the first UE receives a DRX configuration of the first UE and sends a DRX configuration complete message via a PC5-RRC message: the first UE monitors the PC5 message from the second UE based on the DRX configuration, wherein the DRX configuration is acquired from the network or is pre-configured.

In one implementation, the PC5 message comprises at least one of the following: a direct communication request message; a direct communication accept message; a PC5-S message during a layer-2 link establishment procedure; or a PC5-S message used to establish a security connection.

For one example, in some embodiments may include situations wherein only the UE1 is DRX capable, and the UE2 is not DRX capable.

In one implementation, the UE1 does not know whether UE2 is DRX capable UE.

In another implementation, the target UE may be a no DRX capable UE.

In another implementation, the UE-1 sends a PC5 message (such as Direct Communication Request message).

In another implementation, there may be several options for the UE-1 to perform.

For one option, the UE-1 monitors the reception resource pool for sidelink groupcast or broadcast to receive the PC5 message, for example, PC5-S message or PC5-RRC message.

For another option, after PC5 message (such as direct communication request) is sent, the UE1 restarts or starts a timer T0, when the T0 is running, the UE1 may be in active to monitor the SL channel.

In another implementation, t slots or t ms after sending a PC5 message (such as direct communication request), the UE2 restarts or starts a timer T0.

In another implementation, the value of TO and/or t is received from the network.

In another implementation, the value of T0 and/or t is preconfigured.

In another implementation, if the target user information is included in the direct communication request message, and the UE1 receive a PC5 message from the target user, it may stop the timer T0.

In another implementation, the t may be the same with a value of round trip timer (RTT) timer.

In another implementation, after sending a PC5 message (such as direct communication request), the UE2 restarts or starts a RTT timer. In another implementation, when the RTT timer is expired, it restarts or starts a timer T0. In another implementation, when the TO is running, the UE1 may be in active to monitor the SL channel.

In various embodiments, in response to the obtained DRX configuration information of the second UE indicating that the second UE supports the DRX and the first UE not supporting the DRX: the first UE sends the PC5 message to the second UE at any time.

In one implementation, in response to the second UE not receiving any PC5 message during active time of the second UE for a long time, the second UE determines to monitor the PC5 message in no-active time.

In another implementation, in response to the second UE receiving the PC5 message, the second UE sends a second PC5 message as a response to the received PC5 message.

For one example, in some embodiments, only UE2 is DRX capable, and UE1 may not be DRX capable.

In one implementation, if UE1 is not DRX capable, it may send PC5 message at any time. If UE2 is configured with SL DRX, it may miss the PC5 message. For this issue, the UE 2 may decide whether to monitor the PC5 message in the no-active time if it cannot monitor any PC5 message during the active time for a long time.

In another implementation, after the UE2 receives a PC5 message, it may send another PC5 message as a response. The method then may include a portion or all of steps in one or more embodiments described above, including but not limited to switching the notations of UE1 and UE2.

In one embodiment, referring to FIG. 9, a method 900 for wireless communication includes configuring, by a first user equipment (UE), a discontinuous reception (DRX). The method 900 may include a portion or all of the following steps: step 910, sending, by the first UE, discontinuous reception (DRX) configuration assistance information to a second UE; and step 920, receiving, by the first UE, a DRX configuration sent from the second UE.

In one implementation, the DRX configuration assistance information comprises a DRX configuration request.

In another implementation, the DRX configuration assistance information comprises at least one of the following: at least one suggested value of an inactivity timer; or at least one allowed value of the inactivity timer.

In another implementation, the inactivity time associates with a quality of service (QoS) profile.

In another implementation, the DRX configuration assistance information comprises at least one of the following: at least one suggested value of an on-duration timer; or at least one allowed value of the on-duration timer.

In another implementation, the inactivity time associates with at least one of the following: a quality of service (QoS) profile; or a DRX cycle.

In another implementation, the second UE determines the DRX configuration according to a traffic pattern and a current DRX configuration of the first UE.

In another implementation, the second UE determines the DRX configuration for a sidelink between the first UE and the second UE.

In another implementation, before sending the DRX configuration assistance information, the first UE determines a default DRX configuration as the DRX configuration, wherein in response to the first UE being in coverage, the first UE receives a mapping between a QoS requirement and a set of DRX configuration parameters from a network; in response to the first UE being out of coverage, the first UE pre-configures the mapping between the QoS requirement and the set of DRX configuration parameters; and the first UE determines the default DRX configuration based on the QoS requirement.

In another implementation, the first UE determines at least one of the following: a cycle, an on-duration timer, an inactivity timer.

In another implementation, the DRX configuration assistance information comprises at least one of a start offset or a slot offset to the second UE.

In another implementation, the second UE selects the start offset or slot offset according to the DRX configuration assistance information.

In another implementation, the second UE determines at least one of the following: a slot offset, or a RTT retransmission timer.

For one example, in some embodiments, in a first step, a first UE sends SL DRX configuration Assistant information to a second UE.

In one implementation, the SL DRX configuration Assistant information includes SL DRX configuration request.

In another implementation, to avoid that a transmitting (TX) UE configures too long wake-up time for a receiving (RX) UE which is not beneficial for power saving, the RX UE may send suggested SL DRX configurations to the second UE.

In another implementation, the assistant information includes one of: suggested one or multiple values of inactivity timer, and/or allowed or accepted one or multiple maximum values of inactivity timer.

In another implementation, each value of inactivity timer may be associated a quality of service (QoS) profile.

In another implementation, the assistant information includes one of: suggested one or multiple values of on-duration timer, and/or allowed or accepted one or multiple maximum values of on-duration timer.

In another implementation, each value of on-duration timer may associated a QoS profile.

In another implementation, each value of on-duration timer may associated a DRX cycle.

In a second step, the second UE sends the SL DRX configuration to the first UE.

In one implementation, the second UE decides the SL DRX configuration according to its traffic pattern and current SL DRX configuration of the first UE. For example, the second UE determines the SL DRX configurations of the first UE for the link between the first UE and the second UE.

In another implementation, before the first step, a first UE considers a default DRX configuration as its SL DRX configuration, which may be implemented in more than one specific situations.

For one situation, if a UE is in coverage, the UE may receive a mapping between a quality of service requirement and a set of discontinuous reception configuration parameters or an index of the set of discontinuous reception configuration parameters from the network.

For another situation, if a UE is out of coverage, the UE may preconfigure a mapping between a quality of service requirement and a set of discontinuous reception configuration parameters or an index of the set of discontinuous reception configuration parameters.

Then, in another implementation, the first UE decides the default DRX configuration based on the quality of service requirement.

In another implementation, a network may pre-configure a mapping between a QoS and at least one of a DRX cycle, an on-duration timer.

In another implementation, a network may pre-configure a mapping between a QoS and whether a DRX is enabled.

In another implementation, it may be uniformly configured for at least one of an on duration timer, an inactivity timer, or a RTT retransmission timer.

In another implementation, for a unicast mode, it may be configured for a mapping between a level for a power saving need and at least one of an on-duration timer or an inactivity timer.

In another implementation, a RX UE may determine at least one of the following parameters: a DRX cycle, an on-duration timer, an inactivity timer, or a suggested start offset. The RX UE may send the determined one or more parameters to a TX UE. The TX UE, upon receiving the determined parameters, may only determine how to update a slot offset or an RTT retransmission timer.

In one embodiment, referring to FIG. 10, a method 1000 for wireless communication includes configuring a discontinuous reception (DRX). The method 1000 may include a portion or all of the following steps: step 1010, receiving, by a first user equipment (UE), a DRX configuration sent from a second UE; step 1020, in response to the first UE accepting the received DRX configuration, sending, by the first UE, indication information indicating that the received DRX configuration is accepted; and step 1030, in response to the first UE not accepting the received DRX configuration, sending, by the first UE, rejection information indicating that the received DRX configuration is rejected.

In one implementation, in response to the first UE not accepting the received DRX configuration, the first UE sends a suggested DRX pattern and the rejection information indicating the received DRX configuration is rejected.

In another implementation, the rejection information comprises a cause value indicating at least one of the following: that the DRX configuration is not accepted; that an inactivity timer is not accepted; that an on-duration timer is not accepted; or that a slot offset or a start offset is not accepted.

In another implementation, the first UE continues using the DRX configuration that is used prior to a reception of a PC5-RRC message.

In another implementation, the first UE uses the DRX configuration received from a network.

In another implementation, the DRX configuration comprises a default DRX configuration or a common DRX configuration.

For one example, in some embodiments, in a first step, a second UE sends the SL DRX configuration to a first UE via a PC5 RRC message.

In a second step, the first UE may perform various actions, including the following situations.

In one situation, if the first UE can accept the received SL DRX configuration, it may send indication information to indicate that the received SL DRX configuration is confirmed.

In another situation, if the first UE cannot accept the DRX configuration, for example but not limited to, too much wake-up time is configured, it may send the information to reject the DRX configuration of the second UE.

In one implementation, the first UE may also send suggested DRX pattern to the second UE together with the reject information.

In another implementation, the reject information may include a cause value. For example, the cause value can indicate that the DRX configuration is not accepted; the cause value can indicate that the inactivity timer is not accepted; the cause value can indicate that the on duration timer is not accepted; or the cause value can indicate that the slot offset or start offset is not accepted.

In a third step, the first UE may continue using the SL DRX configuration used prior to the reception of the PC5 RRC message. In another implementation, the first UE may use the SL DRX configuration received from the network, for example, a default DRX configuration or a common DRX configuration.

Methods in various embodiments may further include determining, by the first UE, whether a condition is satisfied; and in response to determining that the condition is satisfied, sending assistant information to the second UE as a reference, wherein the condition comprises at least one of the following: that a power saving requirement is changes; or that a current DRX configuration changes.

In one implementation, in response to determining that a QoS traffic changes or a transmission resource changes, the second UE sends the updated DRX configuration to the first UE.

In another implementation, in response to sending the DRX configuration assistance information, the first UE starts or restarts a first timer; and when the first timer is running, the first UE is not allowed to send a discontinuous reception (DRX) configuration assistance information to the second UE.

In another implementation, in response to sending the DRX configuration information, the second UE starts or restarts a second timer; and when the second timer is running, the second UE is not allowed to send a DRX configuration information to the first UE.

In another implementation, the value of the first or the second timer is received from the network or a peer UE.

In another implementation, the value of the first or the second timer is pre-configured or specified.

For one example, in some embodiments, a UE may update a DRX configuration. In some implementations, when a power saving need of the first UE changes, the first UE may send an updated DRX configuration as DRX assistant information to other TX UE as reference.

In some implementations, when the DRX configuration which is currently used, for the first UE changes, the first UE may send an updated DRX configuration as DRX assistant information to other TX UE as reference.

In some implementations, when a QoS traffic of a second UE changes, the second UE may send an updated DRX configuration to the first UE.

In some implementations, when a usable resource pool of the second UE changes, the second UE may send an updated DRX configuration to the first UE.

In various embodiments, a first UE may be a relay UE and a second UE may be a remote UE. In one implementation, for an RRC Idle/INACTIVE remote UE, the remote UE informs a relay UE on requested SIB type(s) via a PC5 RRC message. Then, the relay UE triggers legacy on-demand SI acquisition procedure according to its own RRC state, if needed, and sends the acquired SIB to the remote UE.

In another implementation, an RRC_Connected relay UE can use a DedicatedSIBRequest procedure to request the SI. In a current technology, only PosSIB and SIB12, 13, 14 may be requested in a DedicatedSIBRequest. For the other SIB that si-BroadcastStatus is set to notBroadcasting, the RRC_Connected relay UE may have no way to acquire it. This may not an issue in current specification since those SIBs are not needed for a RRC_Connected UE. In another implementation, if the remote UE is in RRC_Idle/INACTIVE and the relay UE is in RRC_Connected, the relay UE may need to acquire those SIBs for the remote UE. Thus, an additional DedicatedSIBRequest message, for example, which may be named as DedicatedSIBRequest-r17, may be introduced for a relay UE. In the new introduced DedicatedSIBRequest message, more SIB(s) such as SIB2, 3, 4, . . . , 11 may be requested.

Specifically, in another implementation, if a relay UE is configured with onDemandSIB-Request in the RRCReconfiguration message, the UE may be allowed to request SIB(s) on-demand while in RRC_CONNECTED. In one implementation, the UE may set the contents of DedicatedSIBRequest message as follows: if the procedure is triggered to request the required SIB(s), include requestedSIB-List in the onDemandSIB-RequestList to indicate the requested SIB(s); and/or if the procedure is triggered to request the required posSIB(s), include requestedPosSIB-List in the onDemandSIB-RequestList to indicate the requested posSIB(s). In another implementation, the UE may submit the DedicatedSIBRequest message to lower layers for transmission.

Specifically, in another implementation, if a relay UE is configured with onDemandSIB-Request-r16, the requestedSIB-List in the onDemandSIB-RequestList may include only posSIB, SIB12, SIB13, and SIB14.

Specifically, in another implementation, if a relay UE is configured with onDemandSIB-Request-r17, the requestedSIB-List in the onDemandSIB-RequestList may include at least one of SIB2, 3, 4, . . . , 11.

One example of DedicatedSIBRequest message and DedicatedSIBRequest message is described below.

DedicatedSIBRequest message

```
DedicatedSIBRequest-r17-IEs ::=    SEQUENCE {
    onDemandSIB-RequestList-r17           SEQUENCE {
    requestedSIB-List-r17               SEQUENCE (SIZE (1..maxOnDemandSIB-r17))
OF SIB-ReqInfo-r17          OPTIONAL,
    requestedPosSIB-List-r17              SEQUENCE (SIZE (1..maxOnDemandPosSIB-
r17)) OF PosSIB-ReqInfo-r17          OPTIONAL
    } OPTIONAL,
    lateNonCriticalExtension            OCTET STRING          OPTIONAL,
    nonCriticalExtension                SEQUENCE { }          OPTIONAL
```

-continued

```
DedicatedSIBRequest message

}
SIB-ReqInfo-r17 ::=                    ENUMERATED { sib2, sib3, sib4, sib5, sib6,
sib7,sib8, sib9, sib10, sib11,sib12, sib13, sib14,sib15,sib16,spare1 }
```

```
DedicatedSIBRequest message

DedicatedSIBRequest-r16-IEs ::=  SEQUENCE {
   onDemandSIB-RequestList-r16         SEQUENCE {
      requestedSIB-List-r16             SEQUENCE (SIZE (1..maxOnDemandSIB-
r16)) OF SIB-ReqInfo-r16          OPTIONAL,
      requestedPosSIB-List-r16          SEQUENCE (SIZE
(1..maxOnDemandPosSIB-r16)) OF PosSIB-ReqInfo-r16          OPTIONAL
   } OPTIONAL,
   lateNonCriticalExtension          OCTET STRING            OPTIONAL,
nonCriticalExtension                 SEQUENCE { }            OPTIONAL
}
SIB-ReqInfo-r16 ::=                  ENUMERATED { sib12, sib13, sib14, spare5,
spare4, spare3, spare2, spare1 }
```

In another implementation, if a SIB is updated, in the existing mechanism, a UE may receive indications about Si modifications and/or public warning system (PWS) notifications using a short message transmitted with p-radio network temporary identifier (P-RNTI) over downlink control information(DCI). The remote UE needs to be notified through PC5 signaling, such as a PC5 medium access control (MAC) control element (CE), a PC5 RRC message, or sidelink control information (SCI).

In another implementation, in response to that a relay UE receives indications about SI modifications and/or PWS notifications using a short message transmitted with P-RNTI over DCI, the relay UE sends the indications about SI modifications and/or PWS notifications via a PC5 signaling. The PC5 signaling may be one of: a PC5 MAC CE, a PC5 RRC message, or SCI.

In another implementation, in response that the remote UE receives the indications about SI modifications and/or PWS notifications via a PC5 signaling, it informs a relay UE on requested SIB type(s) via a PC5 RRC message. Furthermore, the relay UE may send the updated SIB to the remote UE.

In another implementation, in response that a relay UE receives indications about SI modifications and/or PWS notifications using a short message transmitted with P-RNTI over DCI, the relay UE applies the SI acquisition procedure, and sends the updated SIB to the remote UE.

In another implementation, in response that the relay UE receives the requested SIB type(s) list via a PC5 RRC message from a remote UE before, the relay UE sends the updated SIB that belongs to the requested SIB type(s) list to the remote UE.

In another implementation, before a relay UE sends the indications about SI modifications and/or PWS notifications via a PC5 signaling, it receives an indication from a remote UE. The indication may indicate at least one of the following: a coverage state of the remote UE, for example, in coverage or out of coverage; request SIB forwarding that indicates the remote UE requesting the relay UE forwarding the SIB; request SI modifications and/or PWS notifications forwarding that indicates the remote UE requesting the relay UE forwarding the SI modifications and/or PWS notifications; or request SIB forwarding list that indicates which SIB(s) are requested to be forwarded.

In another implementation, before a relay UE sends the SIB via a PC5 RRC message to a remote UE, it receives an indication from a remote UE. The indication may indicate at least one of the following: a coverage state of the remote UE, for example, in coverage or out of coverage; request SIB forwarding that indicates the remote UE requesting the relay UE forwarding the SIB; request SI modifications and/or PWS notifications forwarding that indicates the remote UE requesting the relay UE forwarding the SI modifications and/or PWS notifications; or request SIB forwarding list that indicates which SIB(s) are requested to be forwarded.

The present disclosure describes methods, apparatus, and computer-readable medium for wireless communication. The present disclosure addressed the issues with configuring a sidelink discontinuous reception (DRX). The methods, devices, and computer-readable medium described in the present disclosure may facilitate the performance of wireless communication by configuring a sidelink DRX, thus reducing power consumption, and improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
obtaining, by a first user equipment (UE), information of whether a second UE supports discontinuous reception (DRX) or the second UE does not support the DRX from an upper layer of the first UE, wherein the information is associated with a destination layer-2 (L2) ID associated to the second UE prior to completing a layer-2 link establishment procedure with the second UE;
obtaining, by the first UE, a DRX configuration from a network or pre-configuration, the DRX configuration comprising a set of DRX parameters, wherein the set of DRX parameters comprises at least one of the following:
a DRX cycle;
a slot offset;
an on-duration timer; or
a start offset;
receiving, by the first UE based on the information of whether the second UE supports the DRX or does not support the DRX, a PC5 message from the second UE; and
in response to the information indicating that the second UE supports the DRX, monitoring, by the first UE, the PC5 message from the second UE based on the DRX configuration,
wherein:
the first UE receives the PC5 message from the second UE during the layer-2 link establishment procedure.

2. The method according to claim 1, wherein:
the PC5 message comprises at least one of the following:
a direct communication request message; or
a direct communication accept message.

3. The method according to claim 1, wherein:
before the first UE sends the DRX configuration to the second UE via a PC5-RRC message, or before the first UE receives the DRX configuration of the first UE and sends a DRX configuration complete message to the second UE via a PC5-RRC message:
the first UE monitors the PC5 message from the second UE based on the DRX configuration, wherein the DRX configuration is acquired from the network or is pre-configured.

4. The method according to claim 1, wherein:
in response to the information indicating that the second UE does not support the DRX or does not know whether the second UE supports the DRX, and the first UE supporting the DRX:
the first UE monitors a reception resource pool for sidelink groupcast or broadcast to receive a PC5 message.

5. A method for wireless communication, comprising:
obtaining, by a first user equipment (UE), information of whether a second UE supports DRX or the second UE does not support the DRX from an upper layer of the first UE, wherein the information is associated with a destination layer-2 (L2) ID associated to the second UE prior to completing a layer-2 link establishment procedure with the second UE; and
sending, by the first UE based on the information of whether the second UE supports the DRX or does not support the DRX, a PC5 message to the second UE,
wherein:
the PC5 message from the first UE is received during the layer-2 link establishment procedure.

6. The method according to claim 5, wherein:
the PC5 message comprises at least one of the following:
a direct communication request message; or
a direct communication accept message.

7. The method according to claim 5, further comprising:
after sending the PC5 message, starting, by the first UE, a timer; and
during the timer running, staying, by the first UE, active to monitor a sidelink (SL) channel,
wherein a value of the timer is received from a network or is pre-configured.

8. The method according to claim 7, wherein:
the PC5 message comprises at least one of the following:
a PC5-RRC message; a PC5-S message; or a PC5-data message.

9. The method according to claim 7, wherein:
a time duration after the first UE sends the PC5 message, the second UE starts a timer.

10. The method according to claim 5, further comprising:
in response to sending the PC5 message, starting, by the first UE, a round trip time (RTT) timer;
in response to the RTT timer expiring, starting, by the first UE, a timer; and
during the timer running, staying, by the first UE, active to monitor a SL channel.

11. The method according to claim 10, wherein:
a value of the timer is received from a network or is pre-configured.

12. An apparatus comprising:
a memory storing instructions; and
a processor in communication with the memory, wherein, when the processor executes the instructions, the processor is configured to cause the apparatus to perform:
obtaining information of whether a second UE supports discontinuous reception (DRX) or the second UE does not support the DRX from an upper layer of the apparatus, wherein the information is associated with a destination layer-2 (L2) ID associated to the second UE prior to completing a layer-2 link establishment procedure with the second UE;
obtaining a DRX configuration from a network or pre-configuration, the DRX configuration comprising a set of DRX parameters, wherein the set of DRX parameters comprises at least one of the following:
a DRX cycle;
a slot offset;
an on-duration timer; or
a start offset;
receiving, based on the information whether the second UE supports the DRX or does not support the DRX, a PC5 message from the second UE; and
in response to the information indicating that the second UE supports the DRX, monitoring the PC5 message from the second UE based on the DRX configuration,
wherein:
the apparatus receives the PC5 message from the second UE during the layer-2 link establishment procedure.

13. The apparatus according to claim 12, wherein:
the PC5 message comprises at least one of the following:
a direct communication request message; or
a direct communication accept message.

14. The apparatus according to claim 12, wherein: before the apparatus sends the DRX configuration to the second UE via a PC5-RRC message, or before the apparatus receives the DRX configuration of the apparatus and sends a DRX configuration complete message to the second UE via a PC5-RRC message:

the apparatus monitors the PC5 message from the second UE based on the DRX configuration, wherein the DRX configuration is acquired from the network or is pre-configured.

15. The apparatus according to claim 12, wherein: in response to the information indicating that the second UE does not support the DRX or does not know whether the second UE supports the DRX, and the apparatus supporting the DRX:

the apparatus monitors a reception resource pool for sidelink groupcast or broadcast to receive a PC5 message.

* * * * *